UNITED STATES PATENT OFFICE.

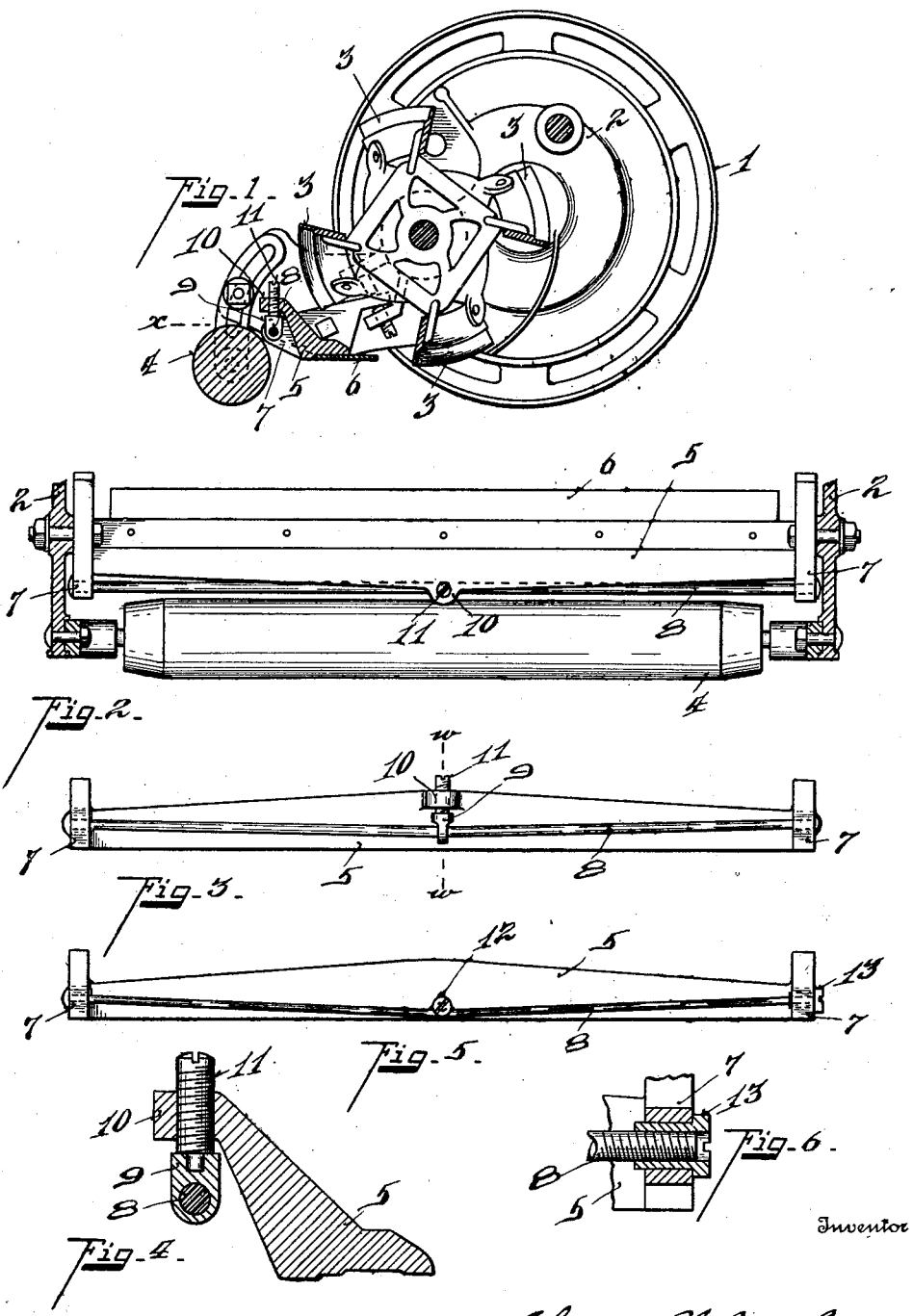

ELWOOD W. McGUIRE, OF RICHMOND, INDIANA.

LAWN-MOWER.

No. 890,998.　　　Specification of Letters Patent.　　Patented June 16, 1908.

Application filed February 3, 1908. Serial No. 414,053.

*To all whom it may concern:*

Be it known that I, ELWOOD W. McGUIRE, a citizen of the United States, residing at Richmond, in the county of Wayne and State of Indiana, have invented certain new and useful Improvements in Lawn-Mowers, of which the following is a specification.

My invention relates to an improvement in the cutting apparatus exemplified by a lawn mower in the drawings.

The object of the invention is to provide means for adjusting or springing up the middle portion of the cutter to proper position relative to the coacting cutters.

The features of my invention are more fully set forth in the description of the accompanying drawings, forming a part of this specification, in which:—

Figure 1 is a central vertical section through the lawn mower. Fig. 2 is a section on line $x$, $x$, Fig. 1. Fig. 3 is a rear plan view of the cutter support and tension device. Fig. 5 is a similar view of a modification. Fig. 4 is a section on line $w$, $w$, Fig. 3. Fig. 6 is a section through the tension adjusting device on one end of the device shown in Fig. 5.

I have found by experience that in the operation of lawn mowers the stiff stubble constantly striking against the under side of the cutter and its support gradually bend upwardly the middle portion thereof. As a consequence the rotary cutters quickly wear away the middle portion of the stationary cutter, leaving a gap at this point which destroys the shearing action. This is evidenced by the failure of the mower to cut evenly, the grass being left higher in a line corresponding to the path of the middle portion of the stationary bar. I have entirely overcome this defect in a very simple manner, namely, by providing an adjustable tension device adapted to exert pressure upon the middle portion of the stationary cutter. As a result when the middle portion of the cutter becomes worn this tension device may be adjusted to throw up, by a flexing action, this middle portion of the stationary cutter and its support, so that the cutters will coöperate as perfectly as when the mower is entirely new.

The preferred features of the invention are disclosed in the drawings, in which 1 represents the wheels, 2 the side frame supporting the usual actuating mechanism for rotating the cutters 3.

4 represents the usual rear pressing roller. 6 represents the lower or stationary cutter held by a support 5. This support has a rearwardly extending ear at each end, marked 7, in which is inserted a tension rod 8.

9 represents an eye support through which the rod 8 passes.

10 represents an ear rearwardly projected from the middle portion of the back of the support 5. It has an adjusting screw 11 threaded therein, the lower end of which bears against the middle portion of the support 9.

In the modification shown in Fig. 5, the rod 8 is bent under a pin 12 on the rear portion of the support, and one end of this rod 8 is provided with an adjusting nut 13 screw threaded upon the rod 8, as shown in Fig. 6, the tightening of which exerts tension on the pin 12 and springs upwardly the middle portion of the support and its stationary cutter.

It will be seen that the same flexing action is effected by tightening up the screw 11 of Fig. 3.

The straining rod 8 and the adjusting bolt 11 being supported by the ear 10 at the central point of the lower cutter-bar, serve as a central support for the same, as well as providing ready means for adjusting the parallelism of the knives by flexing the central portion of the lower knife support.

This device is extremely simple, cheap and efficient, and it vastly increases the life of the machine and insures its uniform and perfect cutting action.

Having described my invention, I claim:—

1. A device of the class described, comprising a movable cutter coöperating with a stationary cutter rigidly supported at each end, means intermediate said supports for springing the middle portion of the stationary cutter in a direction for properly coöperating with the movable cutter, substantially as described.

2. A device of the class described, comprising movable and stationary cutters, and compression means for the middle portion of the stationary cutter intermediate its supports, substantially as described.

3. A device of the class described, comprising movable cutters coöperating with a stationary cutter rigidly supported at each end, compression means intermediate said supports adapted to exert pressure between the ends of the cutter bar to spring the middle portion thereof to proper position, substantially as described.

4. In a device of the class described, a stationary cutter rigidly supported at each end, and an adjustable compression device intermediate said supports for the middle portion of said cutter, substantially as described.

5. A cutter bar for a lawn mower, having means intermediate its supports for springing the middle portion thereof relative to the ends, substantially as described.

6. A cutter bar for a lawn mower, having a tension rod connecting the opposite ends, and an adjusting device adapted to operate upon the middle portions of the bar and rod, substantially as described.

7. A cutter, and a support therefor, a tension rod connecting the ends of the support, and means for exerting compression between the middle portions of said support and rod, substantially as described.

8. A device of the class described, comprising a movable and stationary cutter, means for rigidly supporting the ends of the stationary cutter, and means intermediate said supports for straining the middle portion thereof, substantially as described.

9. A cutter bar for lawn mowers, a stationary cutter supported thereon, and means carried by the cutter bar intermediate its supports for maintaining the cutter in a horizontal plane, substantially as described.

10. A cutter bar for a lawn mower, having means for deflecting the middle portion thereof, said means being carried wholly by said bar.

11. A cutter bar for a lawn mower, having means for deflecting the middle portion thereof, said means comprising a rod carried by said bar, and means on said cutter bar for regulating the tension of said rod.

In testimony whereof, I have hereunto set my hand.

ELWOOD W. McGUIRE.

Witnesses:
OLIVER B. KAISER,
LEE J. O'DONNELL.